United States Patent
Friederich et al.

(12) 
(10) Patent No.: US 6,338,600 B2
(45) Date of Patent: *Jan. 15, 2002

(54) SELF-TAPPING, CORROSION-RESISTANT SCREW WITH HARDENED TIP

(75) Inventors: Heinrich Friederich, Gross-Rohrheim; Reinhard Schmoock, Netphen-Nenkersdorf, both of (DE)

(73) Assignee: EJOT Verbindungstechnik GmbH & Co. KG, Bad Laasphe (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/440,231

(22) Filed: Nov. 15, 1999

(51) Int. Cl.⁷ .................................................. F16B 35/04
(52) U.S. Cl. .............................. 411/424; 411/386; 470/9
(58) Field of Search ................................. 411/411, 424, 411/387.1, 387.4, 386; 148/907; 470/9, 8

(56) References Cited

U.S. PATENT DOCUMENTS

| | | | |
|---|---|---|---|
| 3,344,817 A | * | 10/1967 | Connard |
| 4,233,880 A | * | 11/1980 | Bjorklund |
| 4,281,429 A | * | 8/1981 | Van Den Sype |
| 4,730,970 A | * | 3/1988 | Hyner |
| 5,186,688 A | * | 2/1993 | Uejima |
| 5,700,120 A | * | 12/1997 | Manning |
| 5,755,542 A | * | 5/1998 | Janusz |

FOREIGN PATENT DOCUMENTS

| | | |
|---|---|---|
| DE | 29 29 179 | 1/1980 |
| DE | 30 00 165 | 7/1980 |
| DE | 32 35 447 | 5/1983 |
| DE | 34 34 759 | 5/1986 |
| DE | 195 40 848 | 5/1997 |
| DE | 297 09 932 | 10/1997 |
| DE | 297 06 372 | 12/1997 |
| DE | 198 15 670 | 11/1998 |
| EP | 0 545 852 | 8/1993 |

OTHER PUBLICATIONS

Material Leaflet 670 R of Mannesmannröhren–Werke AG, 1979.
Beitz, et al., *Dubbel*, "Taschenbuch für den Maschinenbau", pp. 31–45, 1987.

* cited by examiner

*Primary Examiner*—Flemming Saether
(74) *Attorney, Agent, or Firm*—Altera Law Group, LLC

(57) ABSTRACT

The invention comprises a self-screwthread-forming screw of corrosion-resistant steel, which screw is partially precipitation-hardened. The invention also concerns a process for producing such a screw in which the screw is firstly shaped by pressing and rolling or by screwthread rolling or cutting or in other known fashion characterized in that the screw is then partially precipitation-hardened.

17 Claims, 1 Drawing Sheet

SELF-TAPPING, CORROSION-RESISTANT SCREW WITH HARDENED TIP

The invention concerns a self-screwthread-forming screw of corrosion-resistant steel.

In general screws have a shank which is provided with a male screwthread and which is delimited by a screw head at one end. As their name suggests, self-screwthread-forming screws automatically form their screwthread in a bore hole when they are screwed in. For that purpose a shank portion at the end of the shank, that is remote from the head, is in the form of a thread-forming region.

Self-screwthread-forming screws can be in the form of drilling screws. Drilling screws have a drilling tip which makes it unnecessary to pre-drill a hole for the screw. The hole for the screw on the contrary is cut by the drilling tip when the drilling screw is screwed in. In a second stage in the same working operation, the screw then forms a screwthread in the bore which has just been cut, and that screwthread affords the screw the desired hole in the bore. A drilling screw therefore avoids the need for the separate working operations which are otherwise necessary, of pre-drilling a hole and cutting a screwthread in the hole. It is therefore desirable to use self-screwthread-forming screws and in particular drilling screws, in place of conventional screws. An alternative to drilling screws is flow-hole-forming screws which also themselves produce the hole required for screwing engagement. Unlike a drilling screw with a drilling tip however the hole is not produced by a cutting procedure but by changing the shape of the material into which the screw is screwed. In that situation, a bead or ridge of material is produced around the hole, and that bead or ridge, also provided with a female screwthread, contributes to the strength of the screw connection in terms of the screw being torn out.

However a conflict occurs whenever a self-screwthread-forming screw as such or in the form of a drilling screw or flow-hole-forming screw is also to be corrosion-resistant. For the screw to form the screwthread and even more for the screw to drill a hole, the screw must have a quite particularly hard shaping region (in this case the cutting region of a drilling screw, formed by the drilling tip, as well as flow-hole-forming shank portions, are also deemed to constitute a shaping region in that respect). Good corrosion resistance and a high level of hardness however are considered to be properties which are generally mutually exclusive.

All previously known proposals for resolving this conflict of aims are unsatisfactory from one point of view or another. It is known for example to produce two-part drilling screws which comprise a hard but corrosion-susceptible material in the region of the drilling tip and the shaping region while in the rest of the shank region they comprise a material which is less hard but in return corrosion-resistant. It will be appreciated that the manufacture of two-part connecting elements of that kind is expensive. Two-part drilling screws are also mentioned in German Utility Model specifications Nos 297 09 932 and 297 06 372. A two-part nail is described in European patent specification No 0 545 852.

Above-mentioned Utility Model specifications Nos 297 09 932 and 297 06 372 also put forward proposals for resolving the above-indicated problem: DE U1 '932 describes a one-part screw of austenitic high-quality steel with partially hard surface. In regard to that partially hard surface, the Utility Model specification only contains the indication that the screw has a hard coating at the drilling tip. The nature of the coating or how the coating is applied is not specified in the Utility Model specification. DE U1 '372 proposes a high-quality steel drilling screw comprising a part of precipitation-hardenable or age-hardenable high-quality steel. It will be appreciated that, as a drilling screw, it has a drilling tip and it is corrosion-resistant as it consists of high-quality steel. What is still not clear in terms of the information set out in the Utility Model specification is how that high-quality steel drilling screw acquires its hardness. The specification merely states that the screw is subjected to through-hardening as a whole. In accordance with the general understanding on the part of the men skilled in the art, a screw is through-hardened when it involves the same level of hardness in the core region and in the edge zones. Conventional through-hardening is effected for example by heating a screw to the austenitisation temperature and quenching it. Heat-treated screws are then tempered.

Screws comprising austenitic stainless, that is to say high-quality steel, are moreover already known from German patent specification No 29 29 179 (column 2, lines 35–38). Those screws acquire their strength in the screwthread flank region by cold work-hardening when shaping the screwthread. In addition to cold work-hardening, transformation martensite formation occurs in the operation of working the metastable austenitic high-quality steel. That results in a higher level of hardness in the worked region.

German laid-open application (DE-OS) No 32 35 447 also discloses a drilling screw of stainless austenitic steel whose drilling and tapping portion acquires the required strength by virtue of case-hardening. This partial case-hardening operation is however expensive and reduces the level of corrosion-resistance. The same applies in regard to the proposal disclosed in German laid-open application (DE-OS) No 30 00 165 whereby the screwthread of a self-tapping screw is cold-worked at $-40°$ C. In that case the increase in hardness is achieved by cold work-hardening and by the formation of transformation martensite. It will be noted however that the method of manufacture is impracticable for mass-scale production at low cost levels, by virtue of the method parameters required.

The varied state of the art shows that the underlying object of the present invention, namely the provision of a self-screwthread-forming screw which at the same time is suitable for screwing into steel of great hardness and which is corrosion-resistant and which can be economically manufactured has hitherto not been satisfactorily attained.

In accordance with the invention that object is attained in a self-screwthread-forming screw of corrosion-resistant steel which is partially precipitation-hardened, more specifically preferably exclusively in the shank portion which is most highly loaded, the shaping region. In this respect, the shaping region includes the screwthread-forming region and also a hole-forming tip such as for example a drilling tip or a flow-hole-forming tip or also a drilling tip with a flow-hole-forming shank portion adjoining same.

The invention is based on the realisation that pure cold work-hardening of the steel on its own or in combination with transformation martensite formation in the cold work-hardening step in the area of the shaping region and possibly the drilling tip is not sufficient to give sufficient hardness and strength to a screw in the area of the shaping region and drilling tip, as is suggested by the state of the art. A desired level of hardness and strength of the screwthread flanks in the shaping region and possibly the drilling tip is surprisingly afforded however if the screw is precipitation-hardened in particular in those regions. Partial precipitation hardening of the screw also has a second advantage: in the precipitation-hardened parts, the resistance to corrosion can admittedly fall slightly depending on the respective alloying composition and heat treatment involved. As however the precipitation-hardened parts make up only a small part of the screw—in the preferred embodiment they even concern only that part of the screw which is only required for drilling the hole and forming the screwthread but not for load-bearing purposes—the screw in other respects retains its original resistance to corrosion without limitations.

A suitable production process for such a screw is distinguished in that the screw is firstly shaped in conventional manner by pressing and rolling and is then preferably partially precipitation hardened by inductive heating. The precipitation hardening Is in that respect preferably limited to the shaping region and possibly the drilling tip of the screw.

The screw is preferably produced from a material which has a high content of interstitially dissolved nitrogen (N). The following range of the chemical composition of the material is preferred:

0.01–0.12% C, in particular 0.07–0.12% C.
1–20% Mn, in particular 1–4% Mn
0–3% Mo,
15–25% Cr, in particular 18–22% Cr
0–15% Ni, in particular 8–14% Ni
0.1–0.9% N, in particular 0.1–0.4% N Nitrides and/or to a slight extent carbides are precipitated due to the precipitation treatment. That causes triggering of the desired increase in hardness—predominantly in the structure regions which are already strengthened and converted by the mechanical transformation operation.

By limiting the carbon content, chromium carbide formation which preferably involves the grain boundaries is deliberately kept low for chromium carbide formation would increase susceptibility in relation to intercrystalline corrosion.

Alternatively, materials which for example contain up to 1.5% of boron present themselves for the production of self-screwthread-forming screws with subsequent partial precipitation hardening. In that respect, borides are precipitated when using a boron-bearing material during the heat treatment. Vanadium-, niobium- or titanium-alloyed materials could possibly also be processed. Screws made of those alternative materials achieve an increase in hardness by virtue of the heat treatment due to the formation of vanadium, niobium or titanium carbide phases.

The invention will now be described in greater detail by means of an embodiment with reference to the drawings in which.

Figure 1:
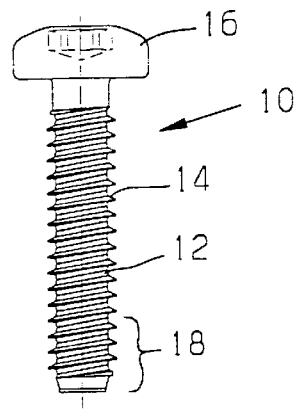
FIG. 1 shows a self-screwthread-forming screw with dome-shaped fillister head.

The self-screwthread-forming screw 10 shown in FIG. 1 has a shank 12 which is provided with a male screwthread 14 and which is delimited at one end by a screw head 16. A shank portion at the end of the shank 12, that is remote from the head, forms a thread-forming region 18. The latter also forms the shaping or forming region of the screw 10. The screw 10 is precipitation-hardened in the region of the thread-forming region 18 so that it is there of greater strength than a workpiece into which the screw 10 is being screwed. Such a workpiece only has to have a hole but not a female screwthread for the female screwthread is formed in the hole in the workpiece by the thread-forming region 18 of the screw 10 when the screw 10 is screwed in.

Figure 2:
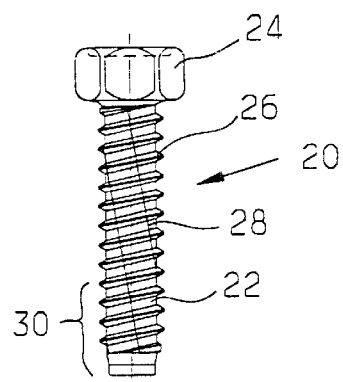
FIG. 2 shows a self-screwthread-forming screw with hexagonal head and shaping groove.

Just like the self-screwthread-forming screw 10 shown in FIG. 1 the self-screwthread-forming screw 20 in FIG. 2 comprises a shank 22 which is delimited at one end by a hexagonal head 24. The shank 22 is provided with a male screwthread 26 which, in comparison with that of the screw 10 in FIG. 1. additionally has forming or shaping grooves 28. The grooves 28 assist with the thread-forming operation and are formed by V-shaped notches in the flanks of the screwthread 26, which are oriented in succession in a forming groove longitudinal direction which extends at a right angle to the screwthread flanks. In the screw 20 in FIG. 2, a portion of the shank 22 at the end thereof that is remote from the head forms a thread-forming region 30 which at the same time is the forming region of the screw 20. When the screw 20 is screwed into a pre-drilled hole, a female screwthread is formed therein, as is also the case with the screw 10 in FIG. 1. In the case of the screw 20 however that operation is also assisted by the grooves 28.

Figure 3:
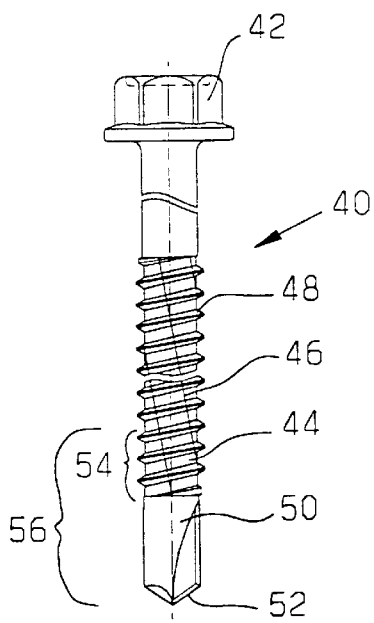
FIG. 3 shows a drilling screw.

FIG. 3 shows a drilling screw 40 which, just like the screw 20 in FIG. 2, has a shank 44 which is delimited by a head 42 and which is provided with a male screwthread 48 having forming grooves 46. The shank is provided with a drilling tip 50, at the end remote from the head. The cutting edges 52 of the drilling tip 50 make it possible for the screw 40 itself to drill its own hole when it is screwed into a workpiece without a hole. In that self-drilled hole, by means of a portion of the shank 44 of the screw which is provided with the male screwthread 48, which shank portion is adjacent the drilling tip 50 and serves as a thread-forming region 54, the screw 40 itself forms a counterpart thread. The drilling tip 50 and the thread-forming region 54 together form a forming region 56 in which the screw 40 is precipitation-hardened. The screw 40 is not precipitation-hardened in the remaining part. As a result, the screw 40 in the forming region 56 has the level of hardness required for the drilling and thread-forming operations while in the rest of it the screw 40 affords the desired toughness with unreduced resistance to corrosion.

Figure 4:
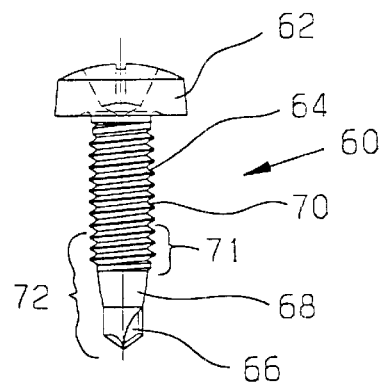
FIG. 4 shows a drilling screw with flow-hole-forming shank portion.

The self-screwthread-forming screw 60 in FIG. 4 which also has a shank 64 defined by a head 62, with a drilling tip 66 at the end of the shank remote from the head 62, additionally has a flow-hole-forming shank portion 68 between the drilling tip 66 and the shank portion which is provided with a male screwthread 70. The drilling tip 66, the flow-hole-forming shank portion 68 and a portion of the shank 64 which is provided with a male screwthread 70, said shank portion being near the shank portion 68 and serving as a thread-forming region 71, together form a forming region 72. The screw 60 is precipitation-hardened only in the region of the forming region 72. When the screw 60 is screwed into a workpiece without a hole, the screw 60, with its drilling tip 66, firstly drills a hole which is then widened by the flow-hole-forming shank portion 68, resulting in the formation of a bead or ridge around the drilled hole. In a situation involving drilling a through hole, the length thereof is increased by virtue of the formation of the bead or ridge. When the screw 60 is further screwed in, it forms a female screwthread which is compatible with the male screwthread 70 on the screw 60, both in the drilled hole and also in the bead or ridge. As that female screwthread is also continued in the bead or ridge formed, it has more load-bearing turns than would be the case if the bore in the workpiece had only been cut by as drilling tip and not enlarged by flow-hole-forming.

Figure 5:
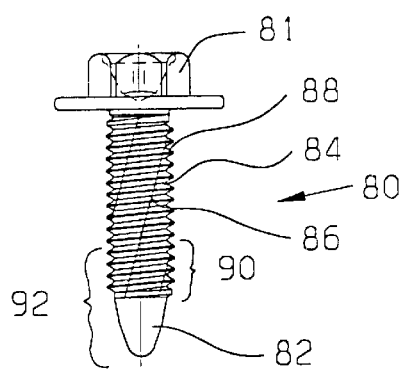
FIG. 5 shows a flow-hole-forming screw with forming grooves.

FIG. 5 shows a screw 80 with a head 81 which, instead of a drilling tip, has a flow-hole-forming tip 82 at one end of a screw shank 84, the tip 82 being suitable for use in pre-drilled sheets or plates. The shank 84 is also provided with a male screwthread 88 provided with forming grooves 86. A portion, which is near the flow-hole-forming tip 82, of the shank 84 which is provided with the male screwthread 88 serves as the thread-forming region 90. The flow-hole-forming tip 82 and the thread-forming region 90 together form a forming region 92, in the area of which the screw 80 is precipitation-hardened. When the screw 80 is screwed into a workpiece without a hole, a hole is initially formed therein by the flow-hole-forming tip 82, more specifically purely by a change in the shape of the material involved, an operation in which no swarf or chips are cut, but the material originally disposed in the area of the bore is displaced to form a bead or ridge around the drilled hole. A female screwthread which is compatible with the male screwthread 88 of the screw 80 is then formed by the thread-forming region 90 on the inside surfaces at the drilled hole including the bead or ridge. The forming grooves 86 assist with that forming operation.

Figure 6:
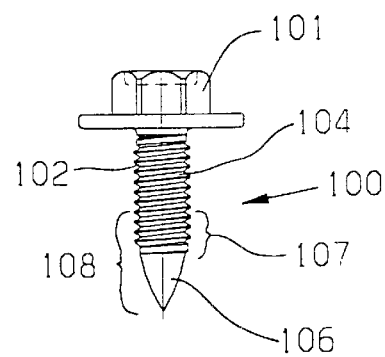
FIG. 6 shows an alternative flow-hole-forming screw without forming grooves.

FIG. 6 shows a self-screwthread-forming and hole-forming screw 100 with a head 101. The screw 100 has a shank 104 which is provided with a male screwthread 102 and which terminates at one end in a flow-hole-forming tip 106. The tip 106 and a portion, which is near thereto and which serves as a thread-forming region 107, of the shank 104 provided with the male screwthread 102 together form the precipitation-hardened forming region 108. When the screw is screwed into a workpiece, the screw 100 of FIG. 6 behaves in a similar manner to the screw of FIG. 5 but the tip 106 of the screw 100 is also suitable for use in connection with sheets or plates which are not pre-drilled.

All the self-screwthread-forming screws 10, 20, 40, 60, 80 and 100 shown in FIGS. 1 to 6 are produced by a wire portion firstly being put into the desired shape by pressing and rolling, and thereby acquiring a Vickers hardness of >350 VH 0.5 in the region of the screwthread flanks. The formed screw is then precipitation-hardened, with the highest increase in hardening occurring in the regions of the material involving the greatest degree of change in shape. In that respect the forming region of the screw acquires a Vickers hardness >420 VH 0.5 and under optimised transformation conditions a Vicker hardness >500 VH 0.5.

In principle precipitation hardening can be effected by hot ageing of the entire screw with conventional furnace heating. Precipitation-hardenable high-quality steels are in that respect treated at temperatures of between 200 and 600° C. for a period of between 1 and 48 hours. The time required for the heat treatment decreases with increasing temperature. Depending on the respective material composition involved however there is an increase in the risk of chromium depletion and thus susceptibility in particular in relation to intercrystalline corrosion. This treatment is relatively cost-intensive.

The specific and controlled application of heat in the shank portions which are subjected to the highest loadings (forming region 18, 30, 56, 72, 92, 108) by inductive heating is more desirable than the above-mentioned conventional heat treatment. In that case, only the respective forming region 18, 30, 56, 72, 92, 108 undergoes precipitation hardening. Such inductive heating means that it is possible to reduce the process times from several hours to seconds to minutes. In addition, the risk of chromium depletion occurs only in the regions of the screw 10, 20, 40, 60, 80 or 100, which are subjected to precipitation hardening. More specifically, as a result of precipitation hardening, there is also precipitation of carbon which with the corrosion-inhibiting chromium in the structure forms chromium carbides which themselves are not corrosion-inhibiting. As a result of that chromium carbide formation at the grain boundaries, chromium depletion occurs in the structure, which causes a reduction in the resistance to corrosion of the steel and increases susceptibility to intercrystalline corrosion. With partial precipitation hardening, chromium depletion is limited to the area of the forming region 18, 30, 56, 72, 92, 108. Partial precipitation hardening therefore also promotes corrosion-resistance properties of a self-screwthread-forming screw and in particular a drilling screw. In addition, as was referred to hereinbefore, chromium depletion can be counteracted by such alloying components as vanadium, niobium or titanium.

After precipitation hardening of the forming region 18, 30, 56, 72, 92, 108 of the screw 10, 20, 40, 60, 80 or 100, the screw is provided with a friction-reducing coating in order in that way to reduce the frictional forces which occur between the screw and the material into which it is screwed.

What is claimed is:

1. A self-screwthread-forming screw of austenitic corrosion-resistant steel comprising a shank having a forming region at one end, wherein the shank is precipitation-hardened in the forming region by induction heating of the one end of the shank, a portion of the shank adjacent the forming region remaining unhardened by precipitation hardening.

2. A screw according to claim 1 wherein the forming region includes a thread forming region.

3. A screw according to claim 2, wherein the forming region further includes a hole-forming tip for forming a hole in a workpiece.

4. A screw according to claim 1, wherein the shank is formed by steel having a chemical composition of:

0.001–0.12% C

1–20% Mn

0–3% Mo

15–25% Cr

0–15% Ni 0.1–0.9% N.

5. A screw according to claim 1 wherein the screw steel includes nitrogen and is nitride-phase precipitation-hardened.

6. A screw according to claim 1 wherein the screw steel contains boron and is boride-phase precipitation-hardened.

7. A screw according to claim 1 wherein the screw steel includes at least one of vanadium, niobium and titanium.

8. A screw according to claim 7 wherein the forming region of the screw is precipitation-hardened by forming at least one of vanadium carbide, niobium carbide and titanium carbide.

9. A screw according to claim 1, wherein the corrosion-resistant steel has a chemical composition of:

0.07–0.12% C

1–4% Mn

0–3% Mo

18–22% Cr

8–14% Ni and 0.1–0.4% N.

10. A screw according to claim 1, wherein the shank further includes a threaded region outside the forming region, at least a portion of the threaded portion not being hardened by precipitation-hardening.

11. A process for manufacturing an austenitic steel, self-tapping screw having a shank with a distal portion, the process comprising:

forming the screw by at least one of pressing, rolling, screwthread rolling and cutting; and precipitation-hardening only the distal portion of the shank by induction heating of the distal portion.

12. A process according to claim 11 wherein the distal portion of the shank includes a forming region of the screw.

13. A self-screwthread-forming screw of austenitic corrosion-resistant steel comprising a shank having a thread forming region at one end, wherein the shank is precipitation-hardened in the thread forming region by induction heating, a portion of the shank adjacent the forming region remaining unhardened by precipitation hardening, the shank being formed of steel having a chemical composition of:

0.001–0.12% C

1–20% Mn

0–3% Mo

15–25% Cr

0–15% Ni 0.1–0.9% N.

14. A screw according to claim 13, wherein the screw steel includes nitrogen and is nitride-phase precipitation-hardened.

15. A screw according to claim 13, wherein the screw steel contains boron and is boride-phase precipitation-hardened.

16. A screw according to claim 13, wherein the screw steel includes at least one of vanadium, niobium and titanium.

17. A screw according to claim 16, wherein the forming region of the screw is precipitation-hardened by forming at least one of vanadium carbide, niobium carbide and titanium carbide.

* * * * *